Nov. 21, 1950 J. L. MOODY 2,530,532
MOTOR FRAME
Filed July 15, 1944 3 Sheets-Sheet 1
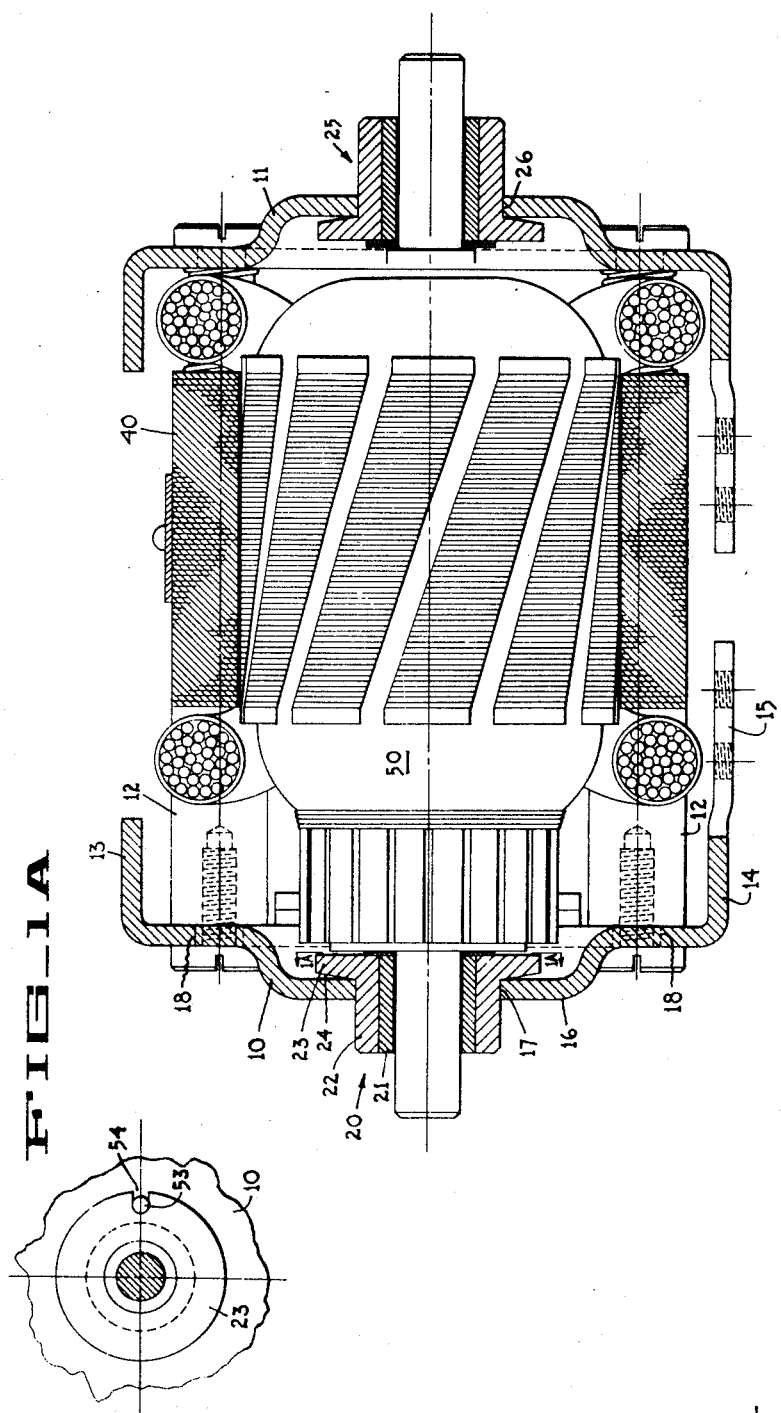
INVENTOR
John L. Moody
BY 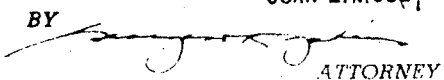
ATTORNEY Nov. 21, 1950 J. L. MOODY 2,530,532
MOTOR FRAME
Filed July 15, 1944 3 Sheets-Sheet 2
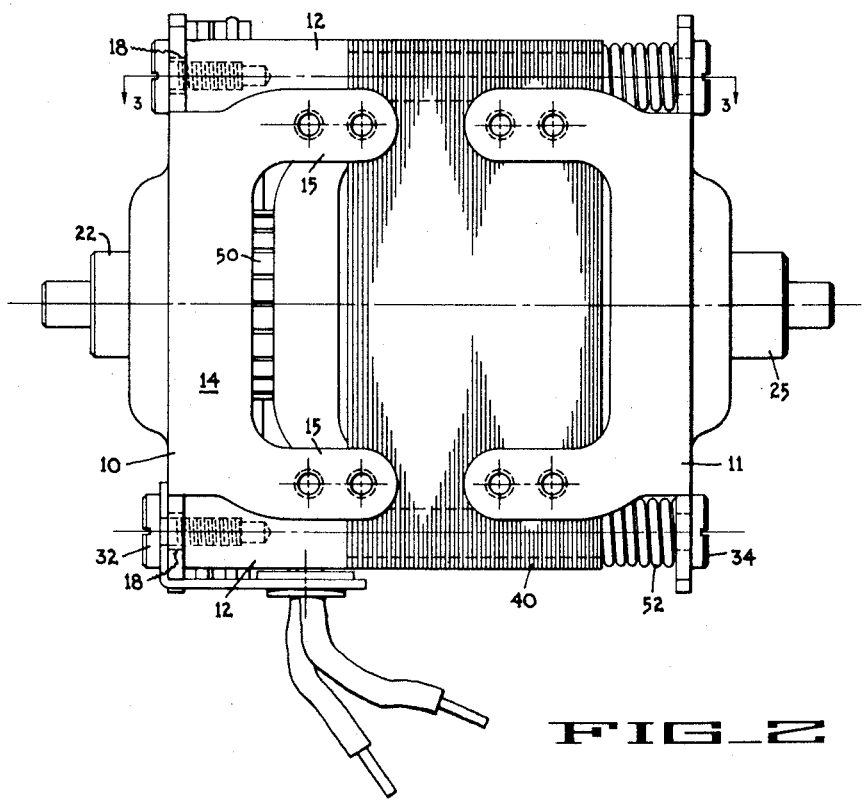
FIG_2
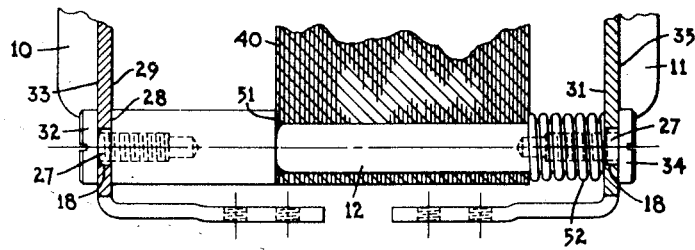
FIG_3
INVENTOR
JOHN L. MOODY
BY
ATTORNEY Nov. 21, 1950  J. L. MOODY  2,530,532
MOTOR FRAME
Filed July 15, 1944  3 Sheets-Sheet 3
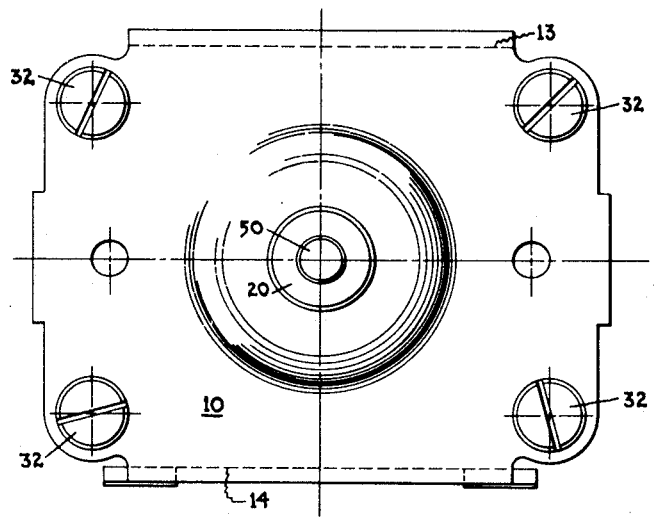
FIG_4
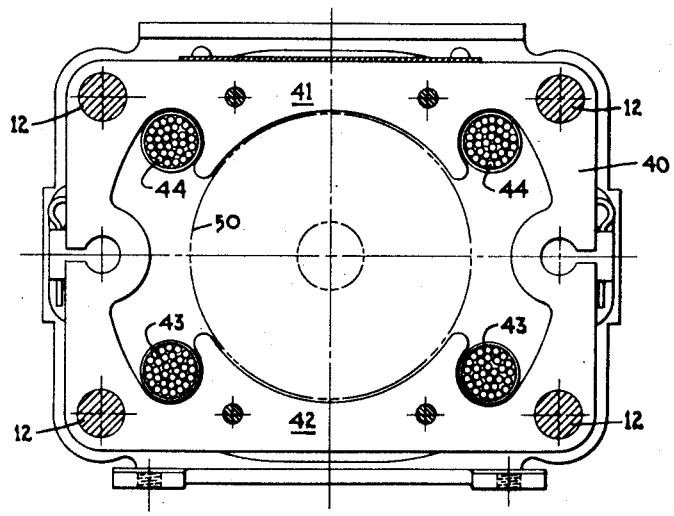
FIG_5
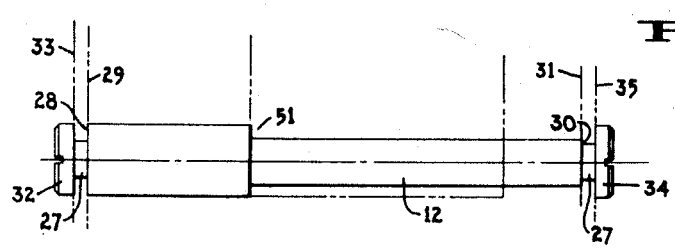
FIG_6
INVENTOR
John L. Moody
BY
ATTORNEY Patented Nov. 21, 1950

2,530,532

UNITED STATES PATENT OFFICE 2,530,532

MOTOR FRAME

John L. Moody, Oakland, Calif., assignor to Friden Calculating Machine Co., Inc., a corporation of California Application July 15, 1944, Serial No. 545,040

8 Claims. (Cl. 308—22)

The invention will be disclosed as embodied in the construction of a frame and bearing support means for a fractional horsepower motor, although it will be evident that features of the invention have wider application.

One of the principal problems in the manufacture of a motor is to construct the parts of the supporting framework so that when the parts are assembled the bearings for the armature shaft will be in alignment, and so that the armature when supported in those bearings will be disposed coaxially within the aperture of the field lamination assembly. With heretofore-employed motor-frame designs and methods of manufacture, the air gap between the armature and the field had to be made undesirably large from a motor performance standpoint in order to allow for the variations in the air gap of different motors produced—these variations being inherent in the design and method of manufacture.

The object of my invention is to proxide a construction and method of manufacture which overcomes these difficulties and enables the air gap to be reduced in production motors, thereby increasing their efficiency and torque.

The usual practice is to construct the motor framework of castings. Castings are in themselves expensive and, furthermore, require extensive and accurate machining operations such as boring the bearing holes, counter-boring surfaces for locating the field lamination assembly in position, and machining the castings to enable them to be accurately fitted together. In spite of the elaborate efforts which are made to construct these cast frames accurately, nevertheless, when they are assembled the bearings for the armature have to be line-reamed because the frame parts cannot be manufactured with sufficient accuracy to have the bearings in alignment when the parts are assembled.

In the drawings:

Fig. 1 is a vertical, longitudinal section through a motor.

Fig. 1A is a detail view of a bearing.

Fig. 2 is a bottom view of the motor.

Fig. 3 is a fragmentary section taken on the line 3—3 of Fig. 2.

Fig. 4 is an end view of the motor.

Fig. 5 is a vertical transverse section thereof.

Fig. 6 is a detail view of one of the dowel rods.

The frame comprises two end shields 10, 11 (Fig. 1) which are rigidly connected together in spaced apart relationship by means of four identical dowel rods 12 (Figs. 1, 2 and 4).

Since the end shields are identical, only one need be described in detail. The end shield 10 is a single piece formed from sheet metal. As shown in the end view (Fig. 4), the body of the shield is substantially rectangular in shape with a horizontally extending flange 13 at the upper edge and a horizontally extending flange 14 at the lower edge. As shown in Fig. 2 the lower flange 14 has two projecting feet 15 which, as shown in Fig. 1, are preferably disposed in a lower plane than the flange 14. The central portion 16 of the body is disposed in a plane parallel to and spaced apart from the plane of the body proper. In the center of the portion 16 is a bearing hole 17. Four dowel rod holes 18 are provided in the four corners of the shield, and two holes are provided in each foot 15. These holes are all punched simultaneously by a special machine tool so that the center to center distance of the holes is accurately determined and is the same in all plates punched with the tool.

The bearing 20 consists of a sleeve or bearing proper 21 which is pressed in a bearing housing 22. The bearing housing has a single flange 23, the face 24 of which is relieved as shown in Fig. 1. The bearing 20 is assembled in the plate 10 by pressing its housing 22 into the hole 17.

As previously explained, the end shield 11 is identical with the end shield 10 and, to insure exact duplication, the two shields preferably have their holes punched by the same tool and are formed in the same die. The bearing 25 is identical to the bearing 20 and is assembled in the end shield 11 in the same manner.

The dowel rods 12 which secure the end shields together also serve to locate the bearing hole 17 in the end shield 10 in alignment with the bearing hole 26 in the end shield 11. One of the dowel rods 12 is shown in detail in Figs. 3 and 6, where it will be noted that it has reduced ends 27 which are adapted to fit into the holes 18 in the end shields. This dowel construction insures alignment of the bearing holes. In order to locate the end shields parallel, each of the dowel rods 12 has a shoulder 28 which is brought into engagement with the face 29 of the end shield 10 and has a shoulder 30 which is brought into engagement with the face 31 of the end shield 11. A screw 32 threaded into the rod 12 bears against the face 33 of the end shield 10, and a screw 34 threaded into the other end of the rod 12 bears against the face 35 of the end shield 11.

The stator is a field lamination assembly 40 which comprises a plurality of plates riveted together, the form of the plate being shown in Fig. 5 where it will be seen that poles 41, 42 are provided, together with suitable apertures for coils 43, 44. The dowel rods 12 pass through holes in the field lamination assembly 40 and serve to support the field assembly, so that the poles 41, 42 are concentric with the bearing holes and the rotor or armature 50. In order to support the field lamination assembly in the correct position axially of the motor, each of the dowel rods 12 has a shoulder 51 (Figs. 3 and 6) against which the assembly 40 fits. In order to allow for variations in the overall thickness of the field lamination assembly at the four corners, I provide on each of the dowel rods 12 a spring 52 which bears at one end against the face 31 of the end shield 11 and at the other end against the field lamination assembly 40. The springs 52 hold the assembly 40 against the shoulders 51 on the dowel rods 12.

After the motor has been assembled as shown, I have found that if the armature 50 does not turn easily in its bearings that the bearings can be aligned to free the armature for rotation by applying a sudden force to the armature transversely of its axis. This can readily be done by holding the motor in the hand and striking the field lamination assembly a blow with a soft hammer.

I will now point out the advantages in my construction. Heretofore in constructing motors, it has been necessary to assemble the motor without the armature and then line ream the bearings. The only way in which the armature bearings could be accurately aligned was by actually machining the bearings after they were in place. In other words each motor had to have its bearings individually reamed to fit. This was due to the fact that it was practically impossible to construct the frame so that the bearings would be accurately enough aligned to permit proper rotation of the armature. It will be evident that with my construction a great saving of time and expense results. No line reaming is necessary. The motor is completely assembled and, as pointed out, if the armature does not turn freely due to misalignment of the bearings, merely striking the motor a blow will automatically cause the bearings to come into alignment.

There are certain factors which I believe contribute to this result and these I shall now point out.

The drawings are an accurate reproduction of a design which has been successfully employed in production where the thickness of the end shield is 0.078" and the diameter of the bearing hole 17 is 0.562". Thus, in the illustrated preferred form, the ratio of the plate thickness adjacent the hole 17 to the diameter of the hole is about .12 to 1. The end shield 10 and the bearing housing 22 are made of steel. The bearing is made of sufficient length to provide adequate bearing surface for the armature shaft. However, it will be noted that the length of the bearing exceeds the thickness of the plate in which it is supported. The thickness of the plate in contact with the bearing housing should not exceed half the length of the housing or the bearing cannot be subsequently adjusted in the above manner.

Another relationship which I think is important is the ratio between the thickness of the plate and the diameter of the hole. The thickness of the metal at the bearing hole should not exceed one-half the diameter of the hole.

In the design shown, bearing housing 22 has a press fit in the hole 17 of the end shield. This is a Class 6 fit as defined by the American Standards Association. This is a fit which is used where parts are to be more or less permanently assembled and light pressure is required in the assembly operation. In general, the diameter of the hole in the frame part should not exceed the diameter of the bearing, the lower limit being the case where the diameters are equal, the upper limit depending upon the strength properties of the metal used.

All of the above factors will vary somewhat with the kind of metal employed, depending especially on the modulus of elasticity and the elastic limit under compression.

I believe another important factor is that the bearing be restricted against axial movement in the frame piece in one direction only. There is only one flange on the bearing housing 22, namely the flange 23, and this flange is preferably relieved as shown at 24 so that the point of contact between the flange and the face of the plate is located as close to the center line of the bearing as possible. I prefer to provide an extrusion 53 (Fig. 1A) in the end shield 10, which fits into a notch 54 in the flange 23. The purpose of this construction is to prevent rotation of the bearing housing 22 in the event that the armature shaft freezes in the bearing.

It is quite possible that in applying force to the armature transversely of its axis to bring the bearings into alignment that compression of the metal in the end shield 10 and/or in the bearing housing 22 occurs, and for this reason I do not recommend the use of extremely hard metals or heavy force fits.

While I have disclosed a bearing supporting means as embodied in a motor frame, it will be apparent that it may be used wherever it is necessary to provide a bearing for a shaft or the like in a part of a framework and particularly where it is necessary to provide more than one bearing for the shaft and to have these bearings in axial alignment.

The advantages of the frame construction which I have disclosed are that it permits making the end shields exact duplicates by punching the holes with the same tool and forming the shields in the same die. This, plus the use of dowel rods which fit into the holes, insures not only that the bearing holes will be assembled in alignment but that the field lamination assembly which is supported on these rods, will be located with its poles concentric with the axis of the armature. This latter is a distinct advantage in that it permits lower manufacturing tolerances in the air gap between the armature and the poles than was heretofore possible, and this reduction in the air gap results in obtaining increased torque from the motor.

I claim:

1. In a device having a shaft, a frame for supporting said shaft, said frame having two spaced apart plates with holes therein, a bearing press fitted into each of said holes and journalling said shaft, the thickness of said plates at each of said holes being less than half the length of the associated bearing, each of said bearings having a single flange engageable with the associated plate for limiting axial movement of said bearing in the associated hole in one direction only, said flange being relieved adjacent the associated plate to prevent engagement of the portion of said flange near the periphery thereof with said plate, said bearings being alignable coaxially with respect to each other and said shaft by application of force to said shaft transversely of its axis when assembled with said bearings.

2. In a device having a shaft, a frame for supporting said shaft having two spaced apart plates with holes therein, bearings inserted respectively in said holes with fits enabling aligning adjustment of the bearings, each of said bearings having a single flange engageable with the associated plate for limiting axial movement of each bearing in the associated hole in one direction only, said flange being relieved adjacent the associated plate to prevent engagement of the portion of said flange near the periphery thereof with said plate, said bearings journalling said shaft and being alignable coaxially with respect to each other and said shaft by force applied to said shaft transversely of its axis when assembled with said bearings.

3. In a device having a shaft, means for supporting said shaft comprising a frame end part having a substantially cylindrical hole therein, and a bearing for said shaft having a substantially cylindrical outer portion press-fitted in said hole, the plate material surrounding said hole and the bearing material within said hole being mutually in gripping relationship, and said bearing being otherwise free for and unconfined against tilting movement relative to the axis of said hole, whereby the position of the axis of said bearing relative to said end part can be changed by applying force to said shaft transversely of its axis when said shaft is in said bearing.

4. In a device having a shaft, means for supporting said shaft comprising a frame plate having a substantially cylindrical hole therein, and a bearing for said shaft having a substantially cylindrical outer portion press-fitted in said hole, the ratio of the plate thickness adjacent said hole to the diameter of said hole being approximately .12 to 1, the plate material surrounding said hole and the bearing material within said hole being mutually in gripping relationship, and said bearing being otherwise free for and unconfined against tilting movement relative to the axis of said hole, whereby the position of the axis of said bearing relative to said plate can be changed by applying force to said shaft transversely of its axis when said shaft is in said bearing.

5. In a device having a shaft, means for supporting said shaft comprising a frame plate having a substantially cylindrical hole therein, and a bearing for said shaft having a substantially cylindrical outer portion press-fitted in said hole, the ratio of the plate thickness adjacent said hole to the diameter of said hole being approximately .12 to 1, said bearing having a single flange engageable with said plate for limiting axial movement of said bearing in said hole in one direction only, said flange being relieved adjacent said plate to prevent engagement of the portion of said flange near the periphery thereof with said plate, the plate material surrounding said hole and the bearing material within said hole being mutually in gripping relationship, and said bearing being otherwise free for and unconfined against tilting movement relative to the axis of said hole, whereby the position of the axis of said bearing relative to said plate can be changed by applying force to said shaft transversely of its axis when said shaft is in said bearing.

6. In a device having a shaft, a frame for supporting said shaft, said frame having two spaced apart end parts each having a substantially cylindrical hole therein, and bearings for said shaft having substantially cylindrical outer portions respectively press-fitted in said holes, the end part material surrounding said holes and the bearing material respectively within said holes being mutually in gripping relationship, and said bearings being otherwise free for and unconfined against tilting movement relative to the axes of the respectively associated holes, whereby the positions of the axes of the bearings relative to the associated end parts can be changed by applying force to said shaft transversely of its axis when said shaft is in said bearings.

7. In a device having a shaft, a frame for supporting said shaft, said frame having two spaced apart plate parts each having a substantially cylindrical hole therein, and bearings for said shaft having substantially cylindrical outer portions respectively press-fitted in said holes, the ratio of the plate thickness adjacent each of said holes to the diameter of the associated hole being approximately .12 to 1, the plate material surrounding said holes and the bearing material respectively within said holes being mutually in gripping relationship, and said bearings being otherwise free for and unconfined against tilting movement relative to the axes of the respectively associated holes, whereby the positions of the axes of the bearings relative to the associated plate parts can be changed by applying force to said shaft transversely of its axis when said shaft is in said bearings.

8. In a device having a shaft, a frame for supporting said shaft, said frame having two spaced apart plate parts each having a substantially cylindrical hole therein, and bearings for said shaft having substantially cylindrical outer portions respectively press-fitted in said holes, the ratio of the plate thickness adjacent each of said holes to the diameter of the associated hole being approximately .12 to 1, each of said bearings having a single flange engageable with the associated plate part for limiting axial movement of the bearing in the associated hole in one direction only, said flanges being relieved adjacent the associated plates to prevent engagement of the flange portions near the flange peripheries with the associated plates, the plate material surrounding said holes and the bearing material respectively within said holes being mutually in gripping relationship, and said bearings being otherwise free for and unconfined against tilting movement relative to the axes of the respectively associated holes, whereby the positions of the axes of the bearings relative to the associated plate parts can be changed by applying force to said shaft transversely of its axis when said shaft is in said bearings.

JOHN L. MOODY.

REFERENCES CITED

The following references are of record in the file of this patent:

UNITED STATES PATENTS

| Number | Name | Date |
| --- | --- | --- |
| 924,451 | Goulet | June 8, 1909 |
| 1,783,446 | Overbury | Dec. 2, 1930 |
| 1,893,699 | Dunning | Jan. 10, 1933 |
| 1,978,484 | Aufiero | Oct. 30, 1934 |
| 2,001,383 | Freed | May 14, 1935 |
| 2,008,493 | Ehrlich | July 16, 1935 |
| 2,274,351 | Wood | Feb. 24, 1942 |
| 2,292,888 | McDonald | Aug. 11, 1942 |
| 2,322,924 | Daiger | June 29, 1943 |